United States Patent [19]
Kondo

[11] Patent Number: 5,930,003
[45] Date of Patent: Jul. 27, 1999

[54] FACSIMILE APPARATUS

[75] Inventor: Masaya Kondo, Kawasaki, Japan

[73] Assignee: Canon Kabushiki Kaisha, Tokyo, Japan

[21] Appl. No.: 07/969,362

[22] Filed: Oct. 30, 1992

[30] Foreign Application Priority Data

Nov. 7, 1991 [JP] Japan .................................. 3-319967

[51] Int. Cl.⁶ ................................................. H04N 1/10
[52] U.S. Cl. ........................................ 358/404; 358/444
[58] Field of Search ................................ 358/404, 444, 358/400, 439, 434, 402, 405, 407, 438, 449

[56] References Cited

U.S. PATENT DOCUMENTS 5,208,681  5/1993  Yoshida .................................. 358/404
5,253,077 10/1993  Hasegawa et al. ....................... 358/404

*Primary Examiner*—Bernard Roskoski
*Attorney, Agent, or Firm*—Fitzpatrick Cella Harper & Scinto

[57] ABSTRACT

A facsimile apparatus capable of managing memory-full status of an image memory on reception or transmission. The apparatus comprises a counter for counting available space of the image memory and function for determining the memory size of one page of received or read data and compares the memory size determined by a reception or reading mode such as "standard", "fine" and "super fine" with the available space of the image memory. If the available space of the image memory is smaller than the memory size requirement, the receiving or reading operation is interrupted or stopped by page unit, preventing problems such as degraded image due to interruption in mid-course of reading operation one page of original, a poor control procedure in reception operation and wasted communication.

16 Claims, 7 Drawing Sheets

| COMPRESSION SCHEME | | MH | MR | MMR |
|---|---|---|---|---|
| SIZE OF ORIGINAL | MODE | | | |
| A3 | SUPER FINE | A | J | a |
| A3 | FINE | B | K | b |
| A3 | STANDARD | C | L | c |
| B4 | SUPER FINE | D | M | d |
| B4 | FINE | E | N | e |
| B4 | STANDARD | F | O | f |
| A4 | SUPER FINE | G | P | g |
| A4 | FINE | H | Q | h |
| A4 | STANDARD | I | R | i |

PAGE MEMORY SIZE TABLE

FIG. 5

FACSIMILE APPARATUS

BACKGROUND OF THE INVENTION

1. Field of the Invention

The present invention relates to a facsimile apparatus which has an image memory.

2. Related Art

A conventional facsimile apparatus, capable of storing received data and read data into an image memory, automatically stores data into the memory till the memory has no available space.

In the above apparatus, if the image memory runs out of available space during the storing of received data or read data, the receiving operation or reading operation of data for one page will be interrupted or stopped midway, causing various problems.

For example, if the memory becomes full in mid-course while reading one page of original, conveying of the original is temporarily stopped and the image data become blurred. As a result, the obtained image is degraded.

In a case where a facsimile apparatus which performs memory transmission (transmission of data stored in a memory) by storing data into an image memory till the memory has no available space and performs direct transmission (transmission of read data without storing them into a memory) after the memory has become full, transmits compressed data, if compression scheme for the memory transmission and compression scheme for the direct transmission are different, an obtained image may be degraded.

If the image memory becomes out of available space while data for one page are being received, a poor control procedure occurs, i.e., the receiving side releases the communication line. If the receiving side releases the communication line in the control procedure of the next page, communication time is wasted because data on the page are not outputted.

SUMMARY OF THE INVENTION

The present invention has been made in consideration of the above situation, and has as its object to provide a facsimile apparatus which can appropriately manage the memory-full status of an image memory upon receiving or transmitting data.

The aforementioned object can be solved by providing a facsimile apparatus comprising means for counting available space of an image memory and means for determining the memory requirement for one page of received data or read data. According to the present invention, the memory size for one page determined based on a receiving mode or a reading mode such as "standard" and "fine" is compared with the available space in the image memory. If the available space in the image memory is smaller than the memory size for the selected page mode, the receiving or reading operation will be interrupted or stopped between pages of the original. In this manner, the receiving or reading operation will be interrupted or stopped by page unit, solving problems such as a degraded image due to interruption or stoppage in reading data midway of a page, a poor control procedure in receiving data and a waste of communication time.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a diagram showing a page memory size table of the embodiment; and

DETAILED DESCRIPTION OF THE PREFERRED EMBODIMENTS

Preferred embodiments of the present invention will be described in detail in accordance with the accompanying drawings.

Figure 1:
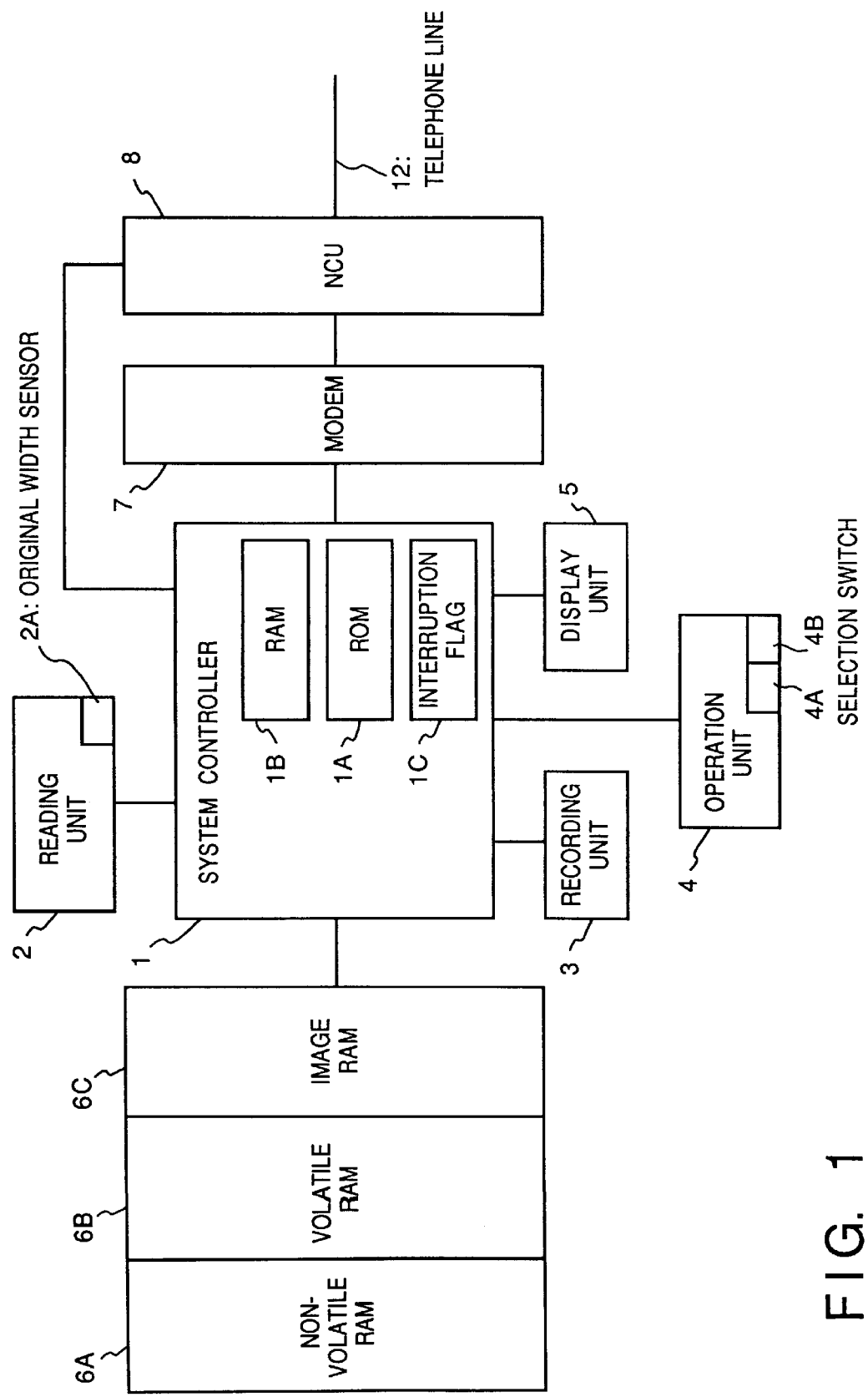
FIG. 1 is a block diagram showing an embodiment of the present invention.

FIG. 1 is a block diagram which shows a configuration of a facsimile apparatus according to a first embodiment of the present invention.

Figure 3:
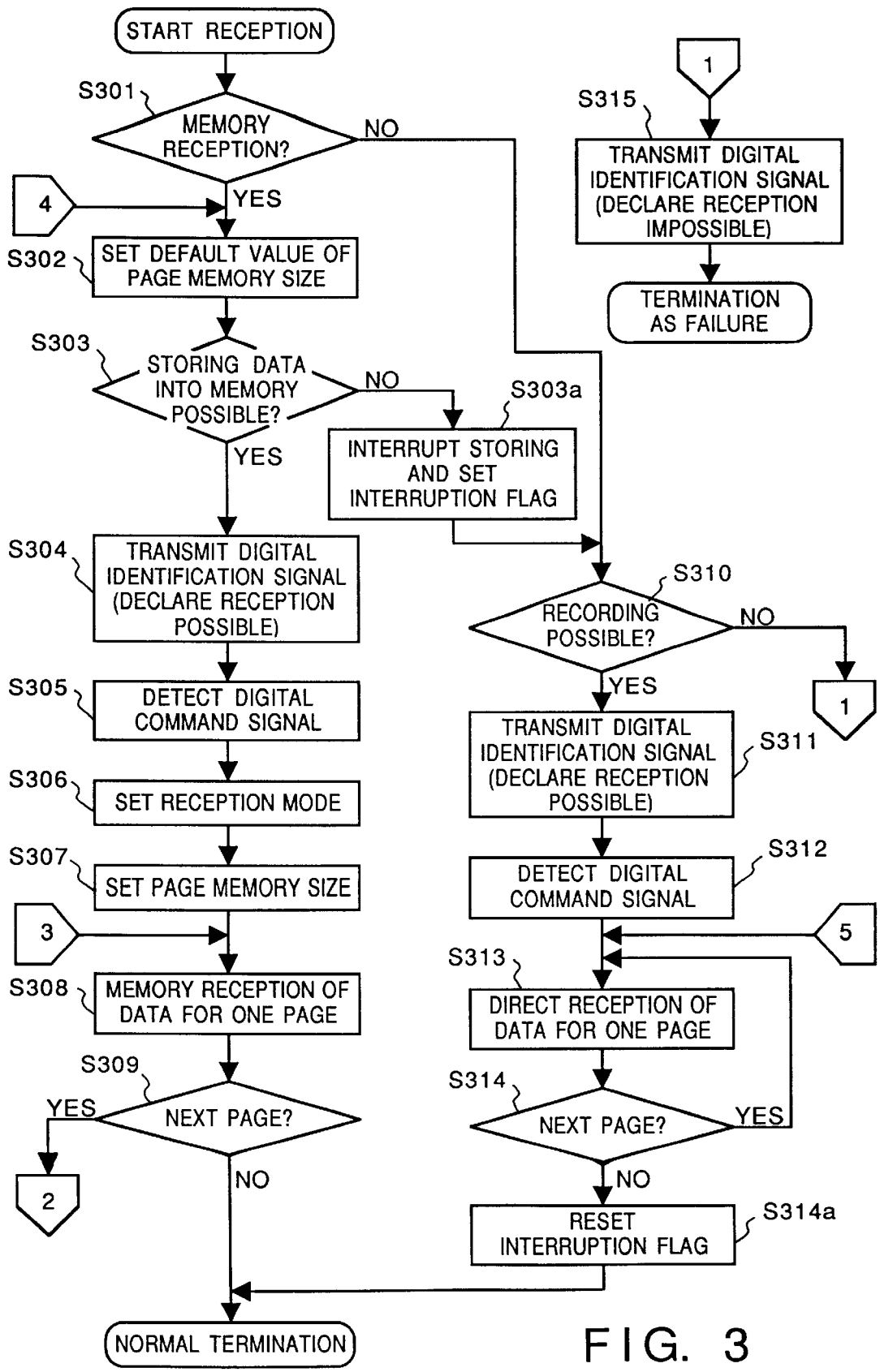
FIG. 3 is a flowchart showing a receiving operation of the embodiment.
Figure 4:
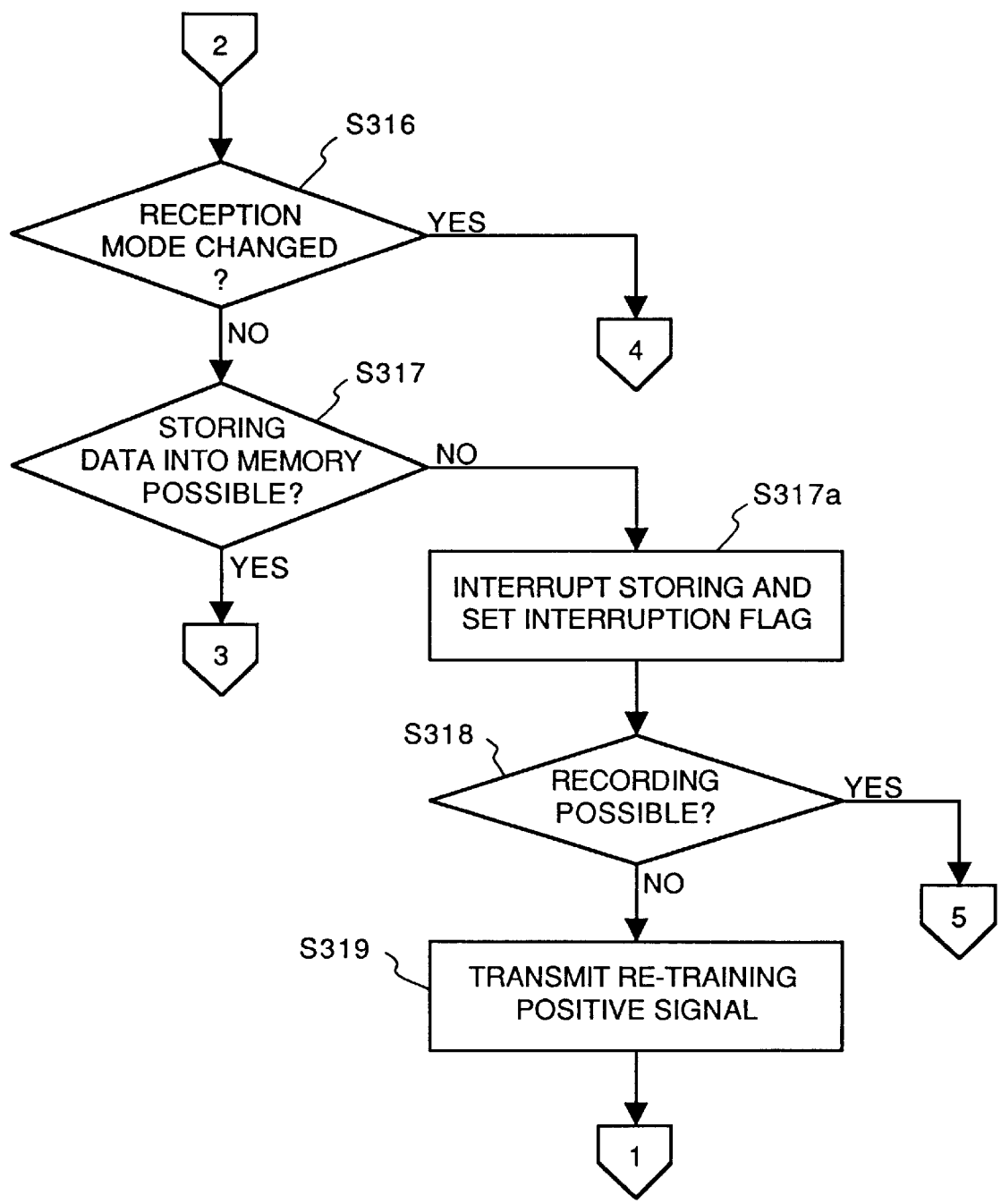
FIG. 4, is a continuation of FIG. 3, a flowchart showing a receiving operation of the embodiment.

In FIG. 1, a system controller 1 is constituted by, e.g., a microcomputer and a storage circuit. The system controller 1 includes a ROM 1A, a RAM 1B and an interruption flag 1C. Control procedures as shown in FIGS. 2 to 4 and a page memory size table as shown in FIG. 5 are stored in the ROM 1A in advance. The RAM 1B includes a counter area for counting available space in an image memory 6C, an auxiliary storage area for the microcomputer, an area for a page memory size Mp and an area for an available amount Mr of the memory. The interruption flag 1C indicates interruption of storing data when it is impossible to store data into the image memory 6C.

A reading unit 2 includes an image sensor, such as CCD, which reads the original to be transmitted and the original conveying mechanism. The reading unit 2 further includes an original width sensor 2A as a part of the original conveying mechanism.

A recording unit 3 records an image corresponding to received image signal on a recording sheet, e.g., by thermal transfer recording.

An operating unit 4 has various operating keys including a selection switch 4A for selecting a reading mode and a selection switch 4B for selecting memory reception (receiving data and storing the received data into a memory).

A display unit 5 displays statuses of the apparatus, alarms and the like. It should be noted that the operating unit 4 and the display unit 5 can be arranged in one operating display unit.

The RAM 6A is a non-volatile RAM into which communication data such as addressees' telephone numbers are registered. Note that a volatile memory backed up by a battery can be employed as the RAM 6A.

The RAM 6B is a volatile RAM into which communication data in a receiving operation are stored.

The RAM 6C is an image memory into which received data and read data are stored. In this embodiment, the RAM 6C is a volatile RAM, however, other devices such as a hard disk can be employed as the RAM 6C.

A MODEM (modulator-demodulator) 7 modulates and demodulates a signal to be transmitted or a received signal. A NCU (network control unit) 8 has a function for transmitting a selection signal (a pulse or a dialling tone). The NCU 8 performs an automatic call receiving operation by detection of a calling tone and a line control operation, further it transmits a selection signal to a telephone line 12 under the control of the system controller 1.

The transmitting and receiving operations, especially in case of memory transmission and memory reception will be described in detail below.

Figure 2A:
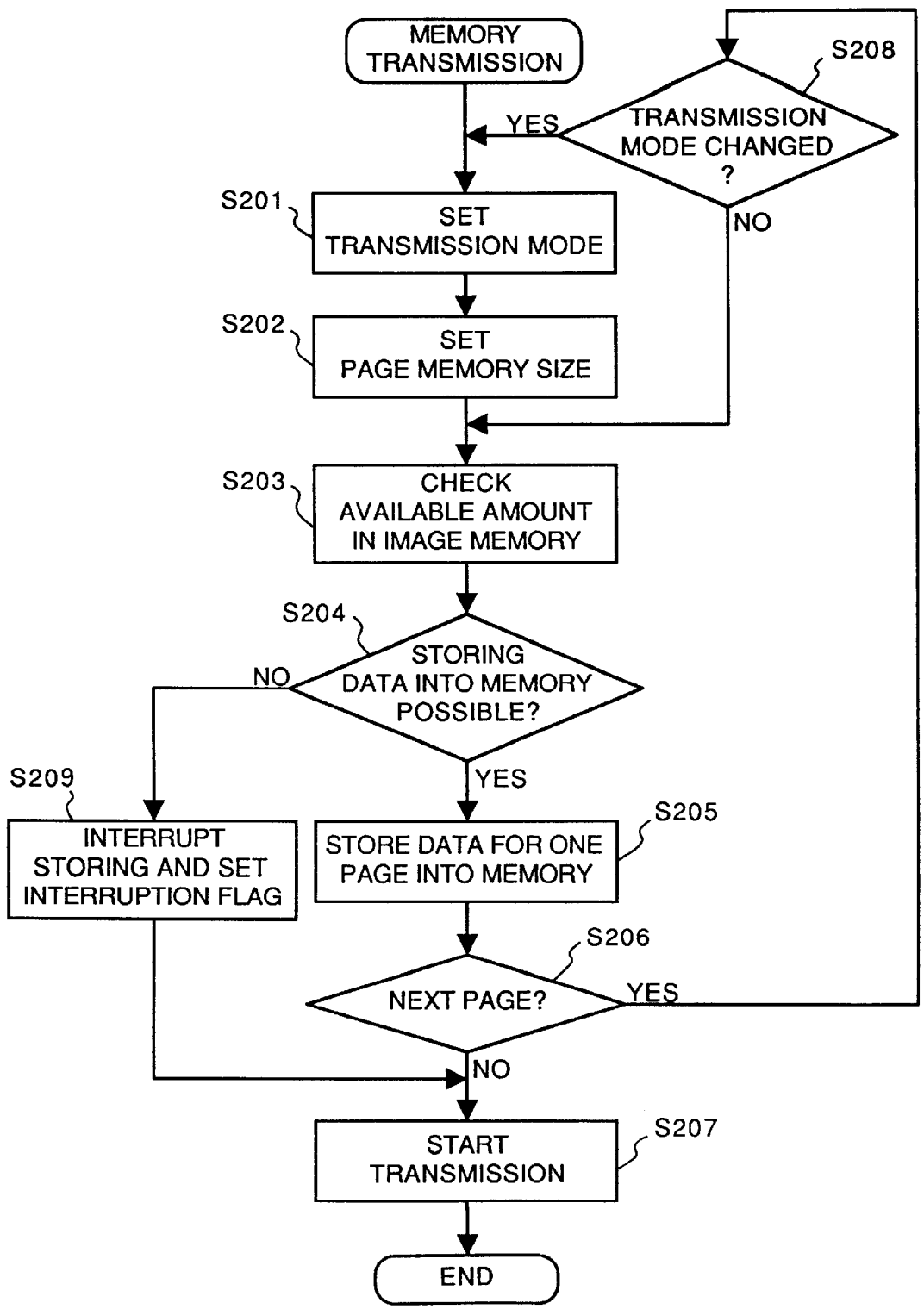
FIGS. 2A and 2B are flowcharts showing a transmitting operation of the embodiment.
Figure 2B:
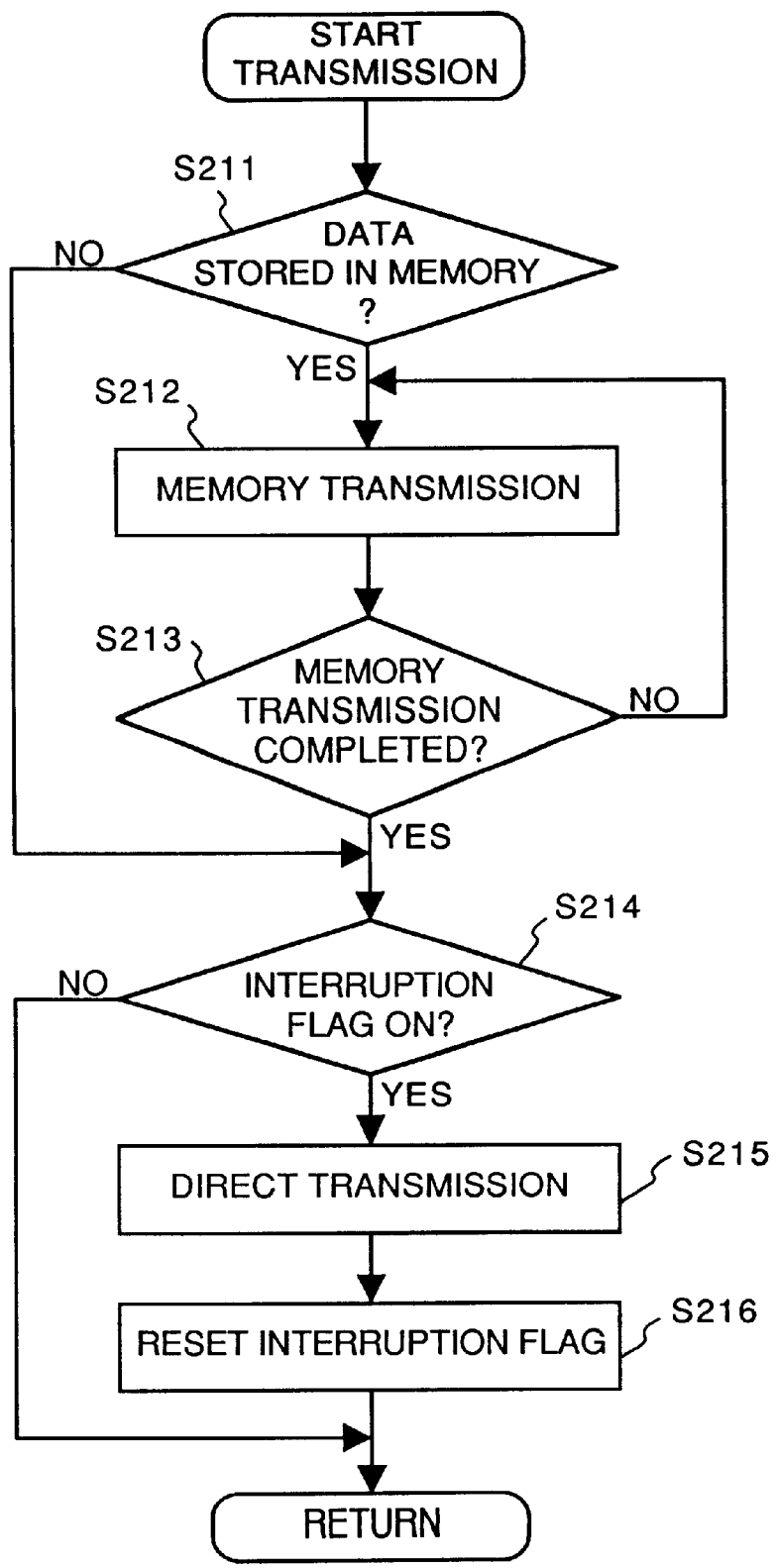

FIGS. 2A and 2B are flowcharts showing an example of the transmitting operation of this embodiment. It should be noted that this transmission is memory transmission, in which read data of an original are stored into the image memory and the stored data are transmitted. As described above, if the image memory becomes out of available space in mid-course while reading one page of original and the reading is interrupted, a degraded image will be obtained. In this embodiment, available space in the image memory is checked between pages of the original. If the memory has enough available space, the storing data into the memory is continued. If the available space is not enough, the storing of data into the memory is interrupted and transmission of the data stored in the memory is started. When the transmission of the data in the memory is completed, the transmission of the rest of the original is followed. In this embodiment, the rest of the original is transmitted by direct transmission.

An example of the transmission in this embodiment will be described below.

First, an user sets an original and selects a transmission mode in step S201. The transmission mode indicates a density of subscanning lines. The user selects one transmission mode among "standard" mode (3.85 lines/mm), "fine" mode (7.7 lines/mm) and "super fine" mode (15.4 lines/mm). The selection of the transmission mode is made by the selection switch 4A in the operating unit 4.

Next, the size of the original is determined by the original width sensor 2A in the reading unit 2. In this embodiment, original sizes can be classified into three sizes "A3", "B4" and "A4". A page memory size Mp which indicates a standard memory capacity for one page of original is set by a determined size of the original, the selected transmission mode and a compression scheme for the data to be transmitted in step S202.

FIG. 5 shows a page memory size table employed in this embodiment. In the table, transmission modes are "standard", "fine" and "super fine", sizes of original are "A3", "B4" and "A4" and compression schemes are "MH (modified Huffman)" coding, "MR (modified READ)" coding and "MMR (modified MR)" coding. One of combinations of transmission mode, size of original and compression scheme is selected from the table and set as the page memory size Mp.

In step S203, available space in the image memory 6C is checked and the memory capacity of the available space is stored in the RAM 1B as an available amount Mr of the image memory.

The page memory size Mp is compared with the available amount Mr of the image memory to determine whether it is possible to store the data into the memory 6C in step S204. If the available amount Mr is larger than the page memory size Mp, it is determined that the one page of data of the original can be stored into the image memory 6C, and in step S205, storing of the data into the memory is started.

If the left available amount Mr is smaller than the page memory size Mp, it is determined that storing the data into the memory is impossible. In step S209, the storing of the data is interrupted and the interruption flag 1C is set to "ON". The data are transmitted in step S207. At this time, if there have been stored data to be transmitted in the image memory 6C in step S211, the stored data are transmitted by memory transmission in step S212. If the memory transmission is completed in step S213 and the interruption flag 1C is ON in step S214, the rest of the original is sequentially transmitted by direct transmission in step S215, thereafter, the interruption flag 1C is set to OFF in step S216. In case there are no data to be transmitted in the image memory 6C, the direct transmission is performed.

In step S204, if it is determined that storing data for one page of the original into the memory is possible, the data are stored into the image memory 6C in step S205, and whether there is a next page of the original is determined in step S206. If NO, the storing of data is terminated and the memory transmission is started in step S207. If YES, whether there is any change in transmission mode, the size of the original and the compression scheme is determined in step S208. If there is no change, the flow returns to step S203 where the storing of data into the memory is performed. If there is some change, the flow returns to step S201 where a page memory size Mp is again set and the storing of data into the memory is performed.

FIGS. 3 and 4 are flowcharts showing the receiving operation of the embodiment. This receiving operation is memory reception in which received data are temporarily stored into an image memory. In this memory reception, as described above, if the image memory becomes full in mid-course while receiving data for one page, a poor control procedure where the receiving side releases the communication line occurs, otherwise the communication time is wasted. For this reason, this embodiment is arranged so that available space of the image memory is checked upon storing received data into the image memory between pages of the original. If the memory has enough available space, memory reception is performed. In case the available space is not enough, the memory reception is interrupted. If direct reception is possible, the direct reception is started. If the direct reception is impossible, the direct reception impossible status is declared in the current control procedure and the transmitting side is notified that the memory has no available space. Thereafter, the communication is terminated.

The receiving operation of this embodiment will be described in detail below.

First, whether memory reception is selected is determined in step S301. In this operation, the user designates whether to perform or not to perform memory reception using the selection switch 4B in the operating unit 4. If recording sheet runs out and recording received data becomes impossible, the current reception is automatically changed into memory reception.

If data are not to be received by memory reception in step S301, the flow advances to step S310 where the data are received by direct reception. In case the memory reception is selected in step S301, the flow proceeds to step S302 for the memory reception.

If direct reception is performed, whether or not recording is possible is determined in step S310. If YES, a receivable bit of a digital identification signal is set and the signal is transmitted to the transmitting side in step S311. Next, a digital command signal corresponding to the digital identification signal from the transmitting side is detected in step S312. Reception mode, size of original and compression scheme are determined by this digital command signal, thereafter, in step S313, direct reception of data for one page is performed.

After the reception of one page of data is completed, whether a next page of the original exists is determined using a control signal (a command signal after a message) in step S314. If NO, the communication is terminated. If YES, the flow returns to step S313 where the direct reception of another page is performed.

In step S310, if it is determined that recording is impossible (reception is impossible), the receivable bit of the digital identification signal is reset and transmitted to the transmitting side in step S315, and then the communication is terminated as "a failure".

In case of the memory reception, a default value of a page memory size Mp is set in step S302. As described above, a page memory size indicates a standard memory capacity for one page of original. Page memory size Mp is determined by the reception mode, size of original and compression scheme.

In this embodiment, the reception mode in receiving operation is selected from "standard", "fine" and "super fine", size of original is either one of "B4" and "A4", and compression scheme is selected from "MH", "MR" and "MMR". Different from the transmitting operation, the reception mode, the size of original and the compression scheme are determined by a digital command signal sent from the transmitting side after the receiving operation has been started. As the page memory size Mp used for determining whether memory reception is possible cannot be set at this stage, the aforementioned default value of the page memory size Mp is set in advance, and the determination is made based upon this default value.

The default value in this embodiment corresponds to a status where the reception mode is "super fine", the size of the original is "B4" and the compression scheme is "MH". The corresponding value read out of the page memory size table as shown in FIG. 5 is set as the page memory size Mp.

In step S303, available space in the image memory 6C is checked and the memory capacity of the available space is stored as an available amount Mr of the image memory into the RAM 1B. Further, the page memory size Mp the above-mentioned default value of which has been set are compared with the left available amount Mr of the image memory to determine whether storing data into the memory is possible. If the available amount Mr is larger than the page memory size Mp, it is determined that the storing of data into the memory is possible. In this case, memory reception is started in step S304. If the left available amount Mr is smaller than the page memory size Mp, it is determined that the storing of data into the memory is impossible. The memory reception is interrupted and the interruption flag 1C is set to ON in step S303a. This is followed by the direct reception in step S311 and the subsequent steps.

In step S303, if it is determined that the memory reception is possible, a receivable bit of a digital identification signal is set and the signal is transmitted to the transmitting side in step S304.

Next, a digital command signal from the transmitting side which corresponds to the digital identification signal is detected in step S305. Reception mode, size of original and compression scheme are determined by this digital command signal in step S306. It should be noted that the "super fine" reception mode and the "MMR" compression scheme in a receiving operation are declared by a non-standard function signal and a non-standard function command signal.

Further, a value corresponding to the status set by the above digital command signal is read out of the page memory size table as shown in FIG. 5 and newly set as a page memory size Mp in step S307.

In step S308, the memory reception is started and received data are stored into the image memory 6C. When the reception of data for one page is terminated, whether there is a next page is determined in step S309 and whether there is any change in the reception mode, the size of the original and the compression scheme is determined in step S316 by a control signal (command signal after a message).

In step S309, if it is determined that there is no next page, the communication is normally terminated. If it is determined that there is a next page and further it is determined that there is some change in the reception mode, the size of the original and the compression scheme, the flow returns to step S302 where a default value of the page memory size Mp is set, and in step S303, the available amount Mr of the image memory is checked, thus the memory reception is continued. In step S316, if it is determined that there is no change in the reception mode, the size of the original and the compression scheme, the flow proceeds to step S317 where a page memory size Mp which has been set in advance and the current available amount Mr of the image memory are compared to determine whether memory reception is possible in step S317. If YES, the flow returns to step S308 where the memory reception for the next page is performed.

In step S317, if it is determined that storing data into the memory is impossible, the storing of data into the memory is interrupted and the interruption flag 1C is set to ON in step S317a. This is followed by step S318 where whether or not recording is possible is determined. If YES, the flow returns to step S313, in which the data for the next and subsequent pages of the original are recorded by direct reception. In this case, as the interruption flag 1C is ON, the status is recorded on a recording sheet or displayed in the display unit 5 to notify the user of the interruption of storing data into the memory. If NO, a re-training positive signal is transmitted in step S319, and the flow returns to step S315, in which a digital identification signal is transmitted. More specifically, as receiving data is impossible at this time, the receivable bit of the digital identification signal has been reset before the signal is transmitted. Thus reception impossible status is declared and the communication is terminated as a failure.

Figure 6:
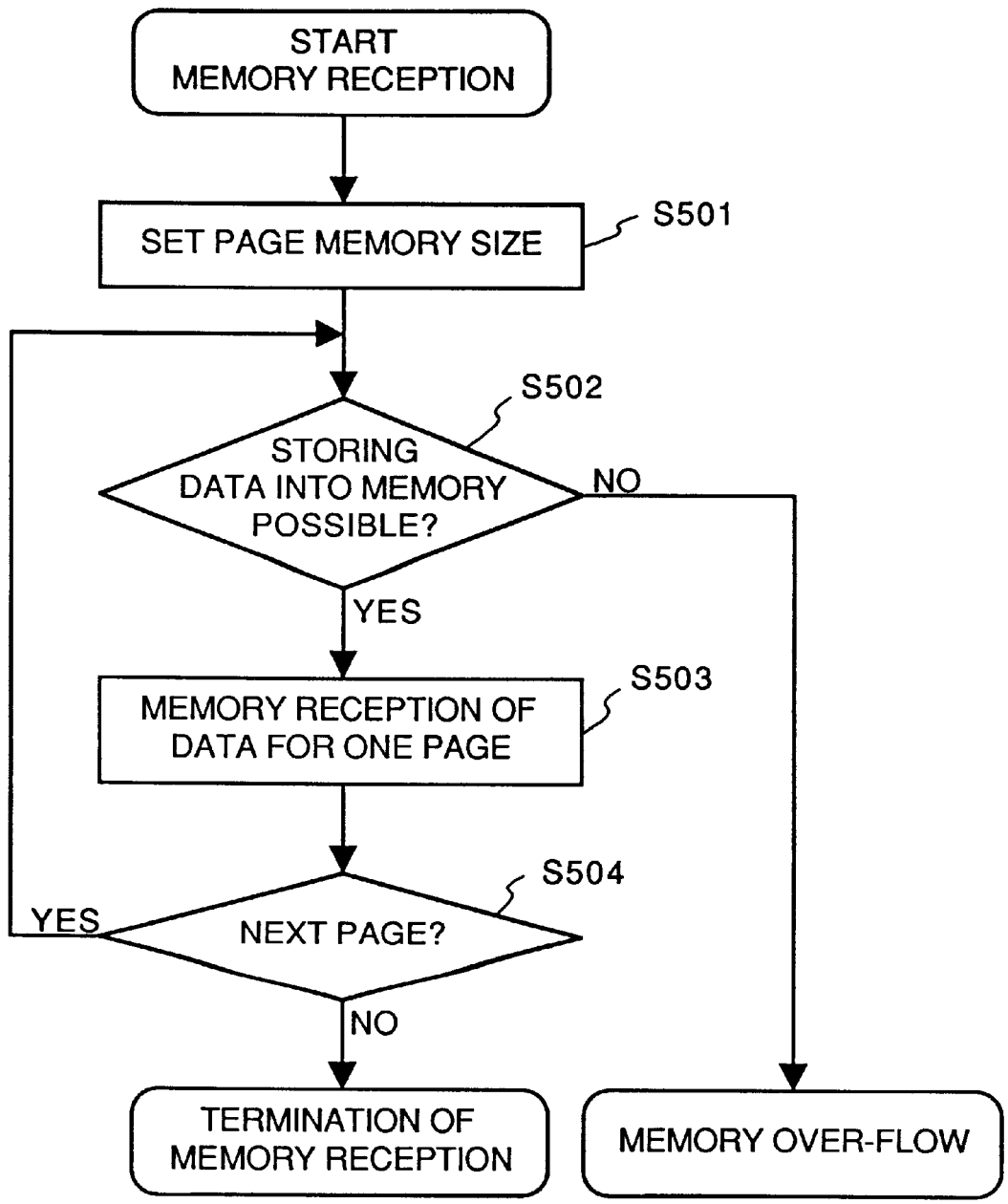
FIG. 6 is a flowchart showing a receiving operation of another embodiment.

FIG. 6 is a flowchart showing as a second embodiment of the present invention an operation in case where the reception operation is simplified.

First, memory reception is started and a page memory size whose value is determined in advance is set in step S501. Next, in step S502, whether or not to store data into the memory is determined by comparing the page memory size and available space of the image memory. If YES in step S502, data are stored into the memory in step S503, and after the reception for one page is determined is completed, whether or not there exists a next page is determined in step S504. If NO in step S504, the memory reception is normally terminated. If YES, the flow returns to step S502 and whether or not storing data for the next page into the memory is possible is determined.

If it is determined that the storing data into the memory is impossible, the memory reception is terminated as "image memory overflow" in the control procedure.

In the above embodiments, the determination of whether or not storing data into the memory is possible is made by comparing a page memory size and available space in the memory, however, the present invention is not limited to this determination. For example, the above determination can be made by writing initial data (an initial value) having the amount of the page memory size into the image memory. If the writing is completed, it is determined that storing data into the memory is possible.

Further, the page memory size is determined by the reception or reading mode, the size of original and the compression scheme. However, these factors for the determination are changeable. For example, the compression scheme may be omitted. Otherwise, a "halftone" mode can be added as a reception or reading mode.

In the above embodiments, a page memory size is set by the page memory size table as shown in FIG. 5, however, the values read out of the page memory size table are not limited to those as shown in FIG. 5. Further, the values which are fixed in the embodiments can be variable and so that the user can set.

In the transmitting operation in the first embodiment, if the available amount of the image memory is small, the storing of data into the memory is interrupted, and the rest of the original is transmitted after the memory transmission is completed, however, the present invention is not limited to this procedure. For example, the rest of the original can be stored into the memory at a point in time where the available amount of the image memory has increased. This can be realized by a simple modification added to the flowcharts of FIGS. 2A and 2B, since the status of the image memory is stored by the interruption flag 1C.

Further, in the receiving operations of the embodiments, if the available amount of the image memory is small, the memory reception is interrupted and direct reception is performed, however, the present invention is not limited to this arrangement. For example, the communication may be terminated without direct reception. Otherwise, the memory reception can be continued if received data stored into the image memory can be output during the memory reception. These are realized by simple modifications to the flowcharts of FIGS. 3 and 4, since the status of the image memory is stored by the interruption flag 1C.

As described above, the present invention enables to interrupt or stop receiving operation or reading operation by page unit by interruption or stoppage of these operations between pages of an original if the available space in the image memory becomes smaller than the memory size for one page. For this arrangement, the present invention has an effect that a degraded image due to interruption or stoppage in reading data of one page halfway, a poor control procedure in receiving data and a waste of communication time can be prevented.

The present invention is not limited to the above embodiments and various changes and modifications can be made within the spirit and scope of the present invention. Therefore, to apprise the public of the scope of the present invention, the following claims are made.

What is claimed is:

1. A facsimile apparatus, comprising:
   reading means for reading an original document and for generating image data in accordance with a selected reading mode;
   an image memory for storing the image data generated by said reading means;
   detection means for detecting an available amount of said image memory;
   control means for determining, before reading each page of the original document, a memory amount necessary to store image data for one page of the original document to be generated in accordance with the reading mode, comparing the determined memory amount with the available memory amount, and causing said reading means to read each page of the original document when the available memory is greater than or equal to the determined memory amount of the original document and storing of the generated image data into the image memory; and
   transmitting means for transmitting the stored image data, wherein when an original document consisting of a plurality of pages is read in said reading step, said control means causes said reading means to read the plurality of pages sequentially and store the read image data into the image memory sequentially, and when the available memory amount is less than the determined memory amount required to store a next page during reading of the plurality of pages, said control means (1) causes said transmitting means to transmit the stored image data, (2) causes said reading means to read a remainder of the original document after the stored image data has been transmitted and (3) causes said transmitting means to transmit image data of the remainder of the original document without storage of the image data of the remainder into the image memory.

2. The facsimile apparatus according to claim 1, further comprising means for selecting the reading mode on the basis of a reading density.

3. The facsimile apparatus according to claim 1, further comprising means for selecting the reading mode on the basis of a reading density and a size of an original document.

4. The facsimile apparatus according to claim 1, further comprising compression means for compressing the read image data in accordance with a coding method which is selected, wherein the compressed image data is stored into said image memory, and wherein said control means determines the memory amount necessary to store the compressed image data for one page of the original document in accordance with the selected reading mode and coding method.

5. An image processing apparatus, comprising:
   generating means for generating image data for a plurality of pages in accordance with a selected parameter by reading an original document;
   an image memory for storing the image data generated by said generating means;
   detection means for detecting an available amount of said image memory;
   control means for determining, before reading each page of the original document, a memory amount necessary to store image data for one page of the original document to be generated in accordance with the selected parameter, comparing the determined memory amount with the available memory amount, and when the available memory is greater than or equal to the determined memory amount, causing said generating means to generate image data of the one page and store the image data of the one page into said image memory; and
   transmitting means for transmitting the stored image data, wherein said control means causes said transmitting means to transmit the image data stored in said image memory, wherein when the original document consists of plural pages, said control means causes said generating means to read the plural pages of the original document sequentially and to store the read image data into said image memory sequentially, and when the available memory amount is less than the determined memory amount required to store a next paqe during reading of the plural pages, said control means (1) causes said transmitting means to transmit the stored image data, (2) causes said generating means to read a remainder of the original document after transmitting the stored image data and (3) causes said transmitting means to transmit image data of the remainder of the original document without storage of the image data of the remainder into said image memory.

6. The image processing apparatus according to claim 5, wherein the selectable parameter is a reading density for said generating means.

7. The image processing apparatus according to claim 5, wherein said generating means has a plurality of selectable parameters for generating the image data, and wherein the plurality of selectable parameters includes a reading density and a document size for said generating means.

8. The image processing apparatus according to claim 5, wherein the plurality of selectable parameters further includes a coding method.

9. A facsimile control method comprising the steps of:
detecting an available amount of memory in an image memory;
determining a memory amount necessary to store image data for one page of an original document to be read in accordance with a selected reading mode;
comparing the determined memory amount with the available memory amount; and
reading of each page of the original document in accordance with the selected reading mode and storing of the read image data into the image memory when the available memory amount is greater than or equal to the determined memory amount, wherein when an original document consisting of a plurality of pages is read in said reading step, reading the plurality of pages sequentially and storing the read image data into the image memory sequentially, and
wherein when the available memory amount is less than the determined memory amount required to store a next page during reading of the plurality of pages, (1) transmitting the stored image data, (2) reading a remainder of the original document after the stored image data has been transmitted and (3) transmitting image data of the remainder of the original document without storage of the image data of the remainder into the image memory.

10. The facsimile control method according to claim 9, further comprising the step of selecting the reading mode on the basis of a reading density.

11. The facsimile control method according to claim 9, further comprising the step of selecting the reading mode on the basis of a reading density and a size of the original document.

12. The facsimile control method according to claim 9, further comprising the step of compressing the read image data in accordance with a coding method which is selected, wherein the compressed image data is stored into the image memory in accordance with the result in said comparing step, and wherein the memory amount necessary to store the compressed image data for one page of the original document is determined in accordance with the selected reading mode and coding method.

13. An image processing method comprising the steps of:
detecting an available amount of memory in an image memory;
determining a memory amount necessary to store image data for one page of an original document to be read in accordance with a selected parameter for a reading mode;
comparing the determined memory amount with the available memory amount;
generating image data of one page of the original document read in accordance with the selected parameter and storing of the image data of the one page into the image memory when the available memory amount is greater than or equal to the determined memory amount required to store the one page, wherein when the original document consists of plural pages, generating the image data for the plural pages of the original document sequentially and storing the generated image data into the image memory sequentially, and
wherein when the available memory amount is less than the determined memory amount required to store a next page, (1) transmitting the stored image data, (2) generating imaged data for a remainder of the original document after transmitting the stored image data and (3) transmitting image data of the remainder of the original document without storage of the image data of the remainder into the image memory.

14. The image processing method according to claim 13, wherein the selected parameter is a reading density of the generated image data.

15. The image processing method according to claim 13, further comprising the step of selecting a parameter from among a plurality of selectable parameters, including a reading density and a document size of the generated image data.

16. The image processing method according to claim 15, wherein the plurality of selectable parameters further includes a coding method.

* * * * *

UNITED STATES PATENT AND TRADEMARK OFFICE
CERTIFICATE OF CORRECTION

PATENT NO. : 5,930,003
APPLICATION NO. : 07/969362
DATED : July 27, 1999
INVENTOR(S) : Masaya Kondo It is certified that error appears in the above-identified patent and that said Letters Patent is hereby corrected as shown below:

COLUMN 3

Line 22, "storing" should read --storing of-- and
      Line 32, "an user" should read --a user--.

COLUMN 9

Line 3, "paqe" should read --page--;
      Line 12, "selectable" should read --selected--;
      Line 19, "claim 5," should read --claim 7,--.

Signed and Sealed this

Seventeenth Day of July, 2007

JON W. DUDAS
*Director of the United States Patent and Trademark Office*